(12) United States Patent
Miyashita et al.

(10) Patent No.: US 6,598,483 B2
(45) Date of Patent: Jul. 29, 2003

(54) CAPACITIVE VACUUM SENSOR

(75) Inventors: Haruzo Miyashita, Yamanashi (JP); Masayoshi Esashi, 11-9, Yagiyamaminami 1-chome, Taihaku-ku, Sendai-shi, Miyagi 982-0807 (JP)

(73) Assignees: Anelva Corporation, Tokyo (JP); Masayoshi Esashi, Miyagi (JP)

( * ) Notice: Subject to any disclaimer, the term of this patent is extended or adjusted under 35 U.S.C. 154(b) by 0 days.

(21) Appl. No.: 09/801,721

(22) Filed: Mar. 9, 2001

(65) Prior Publication Data

US 2002/0011114 A1 Jan. 31, 2002

(30) Foreign Application Priority Data

Mar. 10, 2000 (JP) ........................................ 2000-067625

(51) Int. Cl.$^7$ ................................................ G01L 9/12
(52) U.S. Cl. ........................................ 73/718; 73/724
(58) Field of Search ...... 73/718, 724; 361/283.1–283.4

(56) References Cited

U.S. PATENT DOCUMENTS

| | | | |
|---|---|---|---|
| 4,531,415 A | * | 7/1985 | Orlowski et al. |
| 5,515,711 A | * | 5/1996 | Hinkle |
| 5,902,933 A | * | 5/1999 | Bingo et al. |
| 6,252,759 B1 | * | 6/2001 | Lange et al. |

OTHER PUBLICATIONS

K. Hatanaka et al., Silicon Diaphragm Capacitive Vacuum Sensor, 1995, Technical Digest of the 13th Sensor Symposium, pp. 37–40.*

* cited by examiner

*Primary Examiner*—Max Noori
*Assistant Examiner*—Alandra V. Ellington
(74) *Attorney, Agent, or Firm*—Wenderoth, Lind & Ponack, L.L.P.

(57) ABSTRACT

A capacitive vacuum sensor includes a non-conducting substrate, a plurality of fixed electrodes on the non-conducting substrate, and a diaphragm electrode formed by a plurality of elastic structures, each of the elastic structures being arranged to oppose a respective one of the fixed electrodes and having a different physical size (area) that is the same as that of each corresponding fixed electrode. More specifically, the areas of the elastic structures have a specific relationship between them, as defined by a specific ratio, and the areas may differ successively from each other according to the specific ratio. The capacitive vacuum sensor further includes compensation electrodes that are not sensitive to any change in the capacitance that may occur in response to any change in the pressure, but is only sensitive to any change in the capacitance that may occur in response to any change in the temperature. The elastic structures forming the diaphragm electrode have a plurality of projections on the surfaces to detach the elastic structures, which have been pressed against by the corresponding fixed electrodes under the higher pressure, away from the corresponding fixed electrodes when the pressure becomes lower.

21 Claims, 4 Drawing Sheets

CAPACITIVE VACUUM SENSOR

BACKGROUND OF THE INVENTION

1. Field of the Invention

The present invention relates to a vacuum sensor, and more particularly to a capacitive vacuum sensor that can measure the degree of vacuum over a wide range, wherein the vacuum sensor comprises a single vacuum sensor device that includes a non-conducting substrate, a plurality of fixed electrodes mounted on the non-conducting substrate, and a diaphragm electrode formed by a plurality of elastic structures each having a different square area and mounted to face opposite each respective one of the plurality of the fixed electrodes.

2. Description of the Prior Art

When electronic components or semiconductor devices are manufactured, the thin film deposition or etching process that is proceeded within the vacuum equipment is indispensable. During the process, the vacuum equipment is usually to be maintained at a constant internal pressure. Typically, this internal pressure may be measured by using a capacitive vacuum sensor that provides the capability of measuring the pressure precisely, regardless of the kind of gases employed.

An example of the capacitive vacuum sensor that is currently commercially available includes a diaphragm electrode that is formed by a single elastic structure. The range of pressures that can be measured by this type of vacuum sensor is limited to those pressures having the magnitude of up to three (3) figures. This is the limit of the existing capacitive vacuum sensor, because the single elastic structure can only be deflected slightly in the lower pressure range, and the change in the capacitance can only occur slightly in response to such slight deflection of the elastic structure. Thus, the vacuum sensor cannot detect such a slight change in the capacitance in the lower pressure range. In the higher pressure range, on the other hand, the elastic structure of diaphragm electrode cannot be deflected in proportion to any change in the pressure, and any change in the capacitance cannot be detected. Thus, the pressure range in which the existing capacitive vacuum sensor can respond to any change in the pressure is limited.

Figure 4:
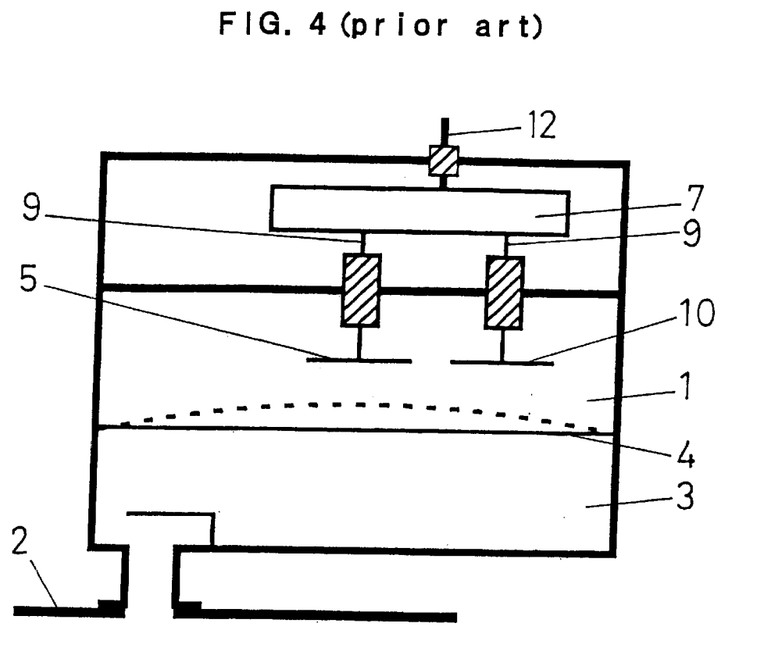
FIG. 4 represents one example of the prior art vacuum sensor construction.

Specifically, one example of the conventional capacitive vacuum sensor is shown in FIG. 4, which is described in U.S. Pat. No. 5,515,711. As shown in FIG. 4, this sensor includes a reference pressure chamber 1 in which a reference pressure prevails. The reference pressure chamber 1 is partitioned from a region 3 leading to the vacuum equipment 2 by a diaphragm electrode 4. A fixed electrode 5 is disposed to face opposite the central portion of the diaphragm electrode 4. The diaphragm electrode 4 is deflected in response to any differential in the pressure between the reference pressure chamber 1 and the region 3 leading to the vacuum equipment 2, as shown by dot-dash lines in FIG. 4. When this occurs, the capacitance that develops between the diaphragm electrode 4 and the fixed electrode 5 may change in inverse proportion to the distance between the diaphragm electrode 4 and fixed electrode 5. This change in the capacitance may be sensed by the vacuum sensor that provides an electrical signal that represents such change from an output terminal. This electrical signal may be fed via a conducting lead 9 to an electric circuit 7 incorporated in the vacuum sensor, where the change in the capacitance may be converted into the corresponding voltage or current. This voltage or current may appear at an output terminal 12. Then, the current pressure may be determined from the voltage or current.

It is noted that the diaphragm electrode 4 may also be deflected by its own thermal expansion or contraction, which may occur when there is any change in the ambient temperature. This may introduce an error in measuring the actual pressures. To avoid this situation, the conventional capacitive vacuum sensor includes an additional compensation electrode 10 that is located to face opposite the diaphragm electrode 4 but is positioned off the central portion of the diaphragm electrode 4. The function of the compensation electrode 10 is to cancel out the capacitance detected at the fixed electrode 5 by the capacitance detected at the compensation electrode 10, and to ensure that the pressures can be measured accurately regardless of any change in the ambient temperature.

To describe this more clearly, the fixed electrode 5 is located opposite the diaphragm electrode 4 such that it is positioned in the central portion of the diaphragm electrode 4, whereas the compensation electrode 10 is also located opposite the diaphragm electrode 4 but is positioned off the central portion of the diaphragm electrode 4. Thus, when any change in the pressure occurs, and the corresponding change in the capacitance then occurs, the resulting capacitance change value that may be detected at the fixed electrode 5 will be greater than the value that may be detected at the compensation electrode 10. When any change in the capacitance is caused by the thermal expansion or contraction, on the other hand, the resulting capacitance change value that may be detected at the fixed electrode 5 will be substantially equal to the value that may be detected at the compensation electrode 10. Thus, the capacitance as detected at the fixed electrode 5 may be cancelled by the capacitance as detected at the compensation electrode 10, so that any change in the capacitance that may be caused by the thermal expansion or contraction may be compensated. The conventional capacitive vacuum sensor is so designed that it can measure the pressures accurately as described above.

It is noted, however, that as the portion of the diaphragm electrode 4 that faces opposite the compensation electrode 10 is formed by the elastic structure, the change in the capacitance that may be detected at the compensation electrode 10 contains two components, that is, one component that corresponds to the change in the capacitance due to the change in the gas pressure and the other component that corresponds to the change in the capacitance due to the thermal expansion or contraction. Thus, if the capacitance as detected at the fixed electrode 5 is cancelled by the capacitance as detected at the compensation electrode 10, the change in the capacitance caused by the change in the gas pressure may also be cancelled. This may degrade the ability or sensitivity of the vacuum sensor to any change in the pressure.

Figure 5:
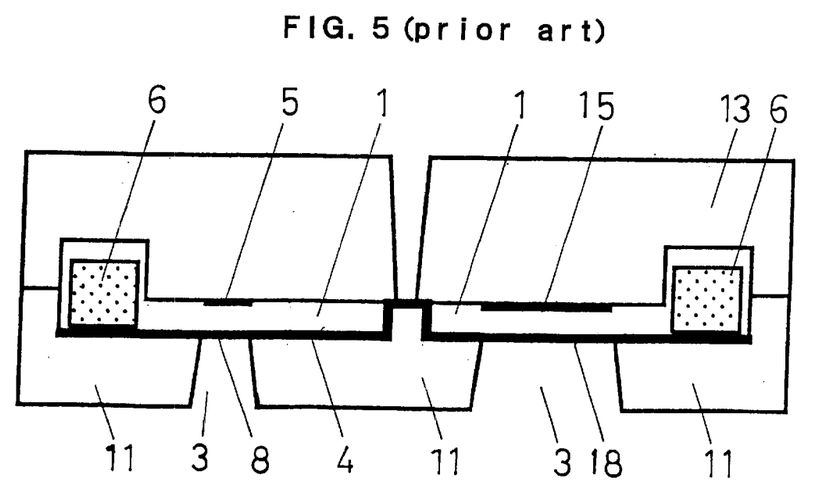
FIG. 5 represents another example of the prior art vacuum sensor construction.

FIG. 5 illustrates another example of the conventional capacitive vacuum sensor that includes a diaphragm electrode based on the dual elastic structure. This capacitive vacuum sensor is built by using the micromachining technology (K. Hatanaka, D. Y. Sim, K. Minami and M. Esahi, Technical Digest of the 13th Sensor Symposium, pp. 37–40 (1995)). In this example, the diaphragm electrode 4 has some portions that are different in the thickness, and the dual elastic structure includes two different size elastic structures, that is, an elastic structure 8 that is 5 $\mu$m in thickness and is 2 mm×2 mm in size, and an elastic structure 18 that is also 5 $\mu$m in thickness but is 4 mm×4 mm in size. Those two elastic structures 8, 18 are supported by a rigid structure 11 that is 200 $\mu$m in thickness. The diaphragm electrode 4 is mounted on the non-conducting substrate 13 under the vacuum condition. The vacuum sensor thus formed includes two reference pressure chambers 1, 1, one for the elastic structure 8 and the other for the elastic structure 18. Getters 6, 6 serve to adsorb any gases that remain in the respective reference pressure chambers 1, 1, keeping the reference pressure chambers 1, 1 under high vacuum. A fixed electrode 5 is provided to face opposite the elastic structure 8 on the non-conducting substrate 13, and another fixed electrode 15 is provided to face opposite the elastic structure 18. The fixed electrodes 5, 15 have the same dimensions as the corresponding elastic structures 8, 18.

Then, when there is any differential in the pressure between the region 3 that leads to the vacuum equipment and each of the reference pressure chambers 1, 1, the corresponding elastic structures 8, 18 are deflected according to that differential. This deflection causes any change in the capacitance that develops between the elastic structures 8, 18 and the corresponding fixed electrodes 5, 15, respectively, from which the actual pressure in the region 3 may be determined. The pressures that may be measured ranges between 300 and 3,500 Pa for the 2-mm square elastic structure 8, and between 30 and 2,900 Pa for the 4-mm square elastic structure 18.

In the conventional capacitive vacuum sensor that may be built by using the micromachining technique, as described above, the diaphragm electrode 4 has the thickness of 5 $\mu$m, and the distance between the diaphragm electrode 4 and fixed electrodes 5, 15 is as small as 4 $\mu$m. The elastic structures 8, 18 may deflect so largely under the high pressures, such as the atmospheric pressures (about 100,000 Pa), that they will be pressed against by the corresponding fixed electrodes 5, 15.

Usually, the capacitive vacuum sensor is based on the principle that when the elastic structures forming the diaphragm electrode (moving electrode undergoing the plastic deformation) deflect under the gas pressure, the amount of the deflection may be taken as the change in the capacitance that develops between the diaphragm electrode and the corresponding fixed electrodes formed by the rigid structures and facing opposite the diaphragm electrode, and then the change in the capacitance may be converted into the corresponding electrical information usually in the form of an electrical signal that may be fed to the electric circuit where the actual pressure may be determined from the electrical information.

As described above, however, the range of the pressures under which the elastic structures forming the diaphragm electrode can be deformed is limited. Thus, the capacitive vacuum sensor that includes the diaphragm electrode formed by the single elastic structure cannot measure the pressure over a wider range.

Then, by providing a diaphragm electrode formed by a plurality of elastic structures, each having a different physical dimension, it may be possible to measure a wider range of pressures. But if the dimension for each elastic structure is determined improperly or is irregular, some of the pressures that may be measured in those different elastic structures might overlap each other. Practically, it is impossible to measure the wider range of the pressures efficiently.

It should also be noted that the individual components of the capacitive vacuum sensor may become deformed by expanding or contracting themselves thermally in response to any change in the surrounding temperature. So that, the capacitance that may be detected at the fixed electrodes may also change accordingly. This may produce an error in measuring the pressure. This error may be removed if a compensation electrode is provided. The compensation electrode is designed to compensate for any error in measuring the pressures. However, the capacitance that may be detected at the compensation electrode may contain the component corresponding to any change in the capacitance that may be produced by any change in the pressure as well as the component corresponding to any change in the capacitance that may be produced by the thermal expansion or contraction. When the capacitance as detected at the fixed electrode is then compensated by the capacitance as detected at the compensation electrode, the compensation might affect the actual change in the pressure that should be determined. This may degrade the ability of the sensor to respond to the pressures.

In the prior art capacitive vacuum sensor as shown in FIG. 5, there is a reference pressure chamber 1, 1 for each of the elastic structures 8, 18. A nonevaporable getter 6, 6 is provided in each of the reference pressure chamber 1, 1. Therefore, the space is required for those nonevaporable getters 6, 6.

In those recent years, the demand for more compact vacuum sensors arises, and therefore the requirement of the space as the before described is contrary to this demand. Actually, to secure that space, the number of sensors that can be deposited on a single substrate must be reduced, and the cost of the final product must be increased.

When the vacuum sensor that is responsive to any change in the pressure is placed under the higher gas pressure, the elastic structures within the sensor may deflect so much that they will press against the corresponding fixed electrodes facing opposite them. Then, when the gas pressure becomes lower, the deflection of the elastic structures will become smaller. Although it may be expected that the elastic structures should be detached from the corresponding fixed electrodes, moving away from the same, as the pressures are reduced, they will still remain attached on the fixed electrodes if a weak attractive force, such as the van der Waals adsorption exists between the elastic structures and the fixed electrodes. If this occurs, the pressures cannot be measured accurately.

When the capacitive vacuum sensor is manufactured by using the micromachining technology, a glass substrate, such as Pyrex™ glass offered by Coning, Inc., is often used, on which the fixed electrode facing opposite the elastic structures of diaphragm electrode is deposited. This type of glass is known as having the thermal expansion coefficient near that of silicon. However, the capacitive vacuum sensor has its structural limitation. That is, electrodes must be formed on one side (front side) of the non-conducting substrate on which the fixed electrode is located as well as on the other side (rear side). And the electrodes of the front side and the rear side must be interconnected by electrically conducting leads. For the glass substrate, it is difficult to make holes through the substrate, and to form thin film on the inner wall of those holes by the deposition process such as evaporation or sputtering process. It is more difficult to deposit thin film if the holes have a small diameter. Thus, it is difficult to provide the electrically conducting paths between the electrodes on one side and on the other side.

SUMMARY OF THE INVENTION

In one aspect of the present invention, the present invention provides a capacitive vacuum sensor that includes a non-conducting substrate, a plurality of fixed electrodes deposited on the non-conducting substrate, and a diaphragm electrode comprises a plurality of elastic structures, wherein each of the elastic structures is arranged to face opposite each respective one of the fixed electrodes, and has a different size or area. Specifically, the capacitive vacuum sensor is designed such that, the size or area of each elastic structure differs successively from one to another according to the specific ratio. This specific ratio is determined such that the ranges of pressures of the gas measured by making use of any change in the capacitance between each respective one of the plurality of elastic structures and each corresponding one of the plurality of fixed electrodes can differ successively according to each one of the plurality of elastic structures. Thereby, although some of the pressures in the pressure range that can be measured at the one elastic structure and the corresponding fixed electrode is allowed to overlap some of the pressures in the pressure range that can be measured at the other elastic structure and the corresponding fixed electrode. The plurality of elastic structures are designed to decrease the overlapped pressure range, as the before described, as small as possible and to widen the pressure range, which can be measured by the single capacitive vacuum sensor having the before described plural combinations of elastic structure of diaphragm electrode and corresponding fixed electrode, effectively. Accordingly, the vacuum sensor can measure the pressures over a wider pressure range efficiently and accurately.

In another aspect of the present invention, the present invention provides a capacitive vacuum sensor having compensation electrodes that are designed such that they are not sensitive to any change in the capacitance that may occur due to any change in the pressure, but are sensitive to any change in the capacitance that may occur due to the thermal expansion or contraction. Thereby, an error in measureing the pressure which is occurred due to the thermal expansion or contraction can be compensated without degrading the measuring sensitiveness corresponding to any change in the pressures.

In still another aspect of the present invention, a single closed space is provided between the fixed electrode on the non-conducting substrate and the diaphragm electrode arranged to face opposite the fixed electrode, and a slit that communicates with the single closed space is provided on part of the non-conducting substrate within which a non-evaporable getter is accommodated. This construction helps enhance the productivity of vacuum sensors being manufactured.

In a further aspect of the present invention, each of the elastic structures of the diaphragm electrode includes a plurality of projections formed on the its surface facing opposite the fixed electrode. These projections act so that they can detach the elastic structures from the corresponding fixed electrodes, moving away from the same, when the pressures are reduced, even if the elastic structures have been pressed against by the corresponding fixed electrodes facing opposite them under the higher pressures.

In an additional aspect of the present invention, the non-conducting substrate includes electrically conducting leads that extend therethrough and provide electrical connections between one side of the non-conducting substrate (front side) on which the fixed electrodes are located and the other side of the non-conducting substrate (rear side).

The above and other aspects of the present invention, which will be more apparent from the following description, address the problems of the prior art, and provide a solution to them.

The present invention concerns a capacitive vacuum sensor that is based on the concept of measuring the pressures of a gas supplied from any external area. Specifically, the capacitive vacuum sensor includes a non-conducting substrate, a fixed electrode formed by the rigid structure and deposited on the non-conducting substrate, and an elastic structure for forming a diaphragm electrode, the elastic structure being arranged to face opposite the fixed electrode so that a space may be defined between the fixed electrode and elastic structure, wherein the vacuum sensor is designed to respond to any change in the capacitance between the fixed electrode and elastic structure that may occur in response to any deflection of the elastic structure that may occur in response to any change in the pressure of the gas applied from any external area. The change in the capacitance may be converted into the corresponding electrical information, usually in the form of an electrical signal, which may be fed to any electrical processing circuit where the information or signal is processed to determine the pressure that corresponds to the change in the capacitance.

In the capacitive vacuum sensor according to the present invention, the diaphragm electrode comprises a plurality of elastic structures, each having a different size, and a rigid structure for supporting the elastic structures. Also, in the present invention, the before described fixed electrode comprises a plurality of fixed electrodes, each of the plurality of fixed electrodes facing opposite each respective one of the plurality of elastic structures and having the same size as those of each corresponding elastic structure. Wherein in the present invention, the plurality of elastic structures have respective areas, as defined by a specific ratio, that differ successively from one to another in such a way that the ranges of pressures of the gas measured by making use of any change in the capacitance between each respective one of the plurality of elastic structures and each corresponding one of the plurality of fixed electrodes can differ successively according to each one of the plurality of elastic structures.

In the capacitive vacuum sensor of the present invention, the elastic structures forming the diaphragm electrode deflect in proportion to the gas pressure that is to be measured, and the deflection is defined as having a specific relationship to the size or area of each respective elastic structure.

More specifically, the plurality of elastic structures for forming the diaphragm electrode includes a first elastic structure and a second elastic structure for example. Then, the range of pressures, as expressed in terms of a particular magnitude or number of figures (such as the pressures that range between 10 Pa and 10,000 Pa, as expressed by three figures) may be measured at the first elastic structure, and the range of pressures, as expressed in terms of a different particular magnitude or number of figures (such as the pressures that range between 0.01 Pa and 10 Pa, as expressed by three figures) may be measured at the second elastic structure. The pressures in the different ranges that may be measured at the different elastic structures may be successive from one elastic structure to another. The deflection that occurs on each different elastic structure is defined to have a specific relationship to the area of each different elastic structure, and so the areas of the first and second elastic structures are defined to have a specific relationship such that those areas correspond to the respective ranges of the pressures as expressed in the different magnitudes or numbers of figures, such as two, three, four or more figures, so that different pressures can be measured at the different elastic structures.

The present invention is based on the above concept. That is, although some of the pressures in the pressure range that can be measured at the one elastic structure and the corresponding fixed electrode is allowed to overlap some of the pressures in the pressure range that can be measured at the other elastic structure and the corresponding fixed electrode each other, the size or area of each of the plurality of elastic structure is designed by a specific ratio to decrease the pressure range, which is overlapped as the before described, as small as possible and successively change the pressure range (pressure range as expressed in terms of numbers of figures), which is measured by the each combination of elastic structure of diaphragm electrode and corresponding fixed electrode, from one combination to another, and then totalled, to widen the pressure range measured by the single capacitive vacuum sensor.

As a specific example, consider that each of the elastic structures that form the diaphragm electrode has the square shape. When one side of the square shape has a give length of a, the pressure P exerted upon each elastic structure, and the possible deflection W of each elastic structure that may result may be expressed as the following equation.

$$W \; P \quad \underline{a}^4$$

It may be seen from the above equation that when the elastic structure has the square shape, a particular elastic structure may be deflected in proportion to the pressure that is applied and measured at that particular elastic structure, and the deformation and the square area may have such a relationship that the deflection occurs in proportion to the fourth power of a.

Now, suppose that the capacitive vacuum sensor includes the first elastic structure that has the smallest square area, where any pressure values between 100 Pa and 10,000 Pa may be measured, and the second elastic structure that has the next smallest square area, where any pressure values between 1 Pa and 100 Pa, which succeed from the pressures at the first elastic structure, may be measured. Namely, it is supposed that as combined, any pressures in the different ranges, as expressed in terms of the magnitude or number of four figures, can be measured at the before described first and second elastic structures.

As described above, any pressures in the respective pressure range, as expressed in terms of the magnitude or number of double figures, may be measured at each of the two elastic structures. It is clear from the above equation that the gas pressure values being measured are proportional to the fourth power of a which represents the length of one side of the square elastic structure, and $100^{1/4}$=3.16. Thereby, the square area $S_1$ for the first elastic structure and the square area $S_2$ for the second elastic structure have a specific relationship or ratio, namely, $S_2$=9.99(=$3.16^2$)×$S_1$.

In the same capacitive vacuum sensor, it is supposed that each of the two elastic structures may measure any pressures within the respective pressure range, as expressed in the terms of three figures. More specifically, the first elastic structure may measure any pressures between 10 Pa and 10,000 Pa, and the second elastic structure may measure any pressures between 0.01 Pa and 10 Pa. As the first and second elastic structures having the different square areas, the total pressures in the different ranges, as expressed in terms of six figures, may be measured using the before described first and second elastic structures. In this case, it is also clear from the above equation that the gas pressure values being measured are proportional to the fourth power of $\underline{a}$, which represents the length of one side of the square elastic structure, and $1000^{1/4}$=5.62. Thereby, the square area $S_1$ for the first elastic structure and the square area $S_2$ for the second elastic structure have a specific relationship or ratio, namely, $S_2$=31.58 (=$5.62^2$)×$S_1$.

More specifically, if the square elastic structure has one side whose length is equal to 3.16 times longer than the one side of the other square elastic structure, or the square area that is equal to 9.99 (=$3.16^2$) times bigger than the square area of the other square elastic structure, the pressure range that may be measured may be shifted down by a factor of two figures. Conversely, if the length is reduced to $1/3.16$ (or $1/9.99$ in terms of the relative square area), the pressure range that may be measured may be shifted up by a factor of two figures. Similarly, if the square elastic structure has one side whose length is equal to 5.62 times longer than the one side of the other square elastic structure, or the square area that is equal to 31.5 (=$5.62^2$) times bigger than the square area of the other square elastic structure, the pressure range that may be measured may be shifted down by a factor of three figures. Reversely, if the length is reduced to $1/5.62$ (or $1/31.58$ in terms of the relative square area), the pressure range that may be measured may be shifted up by a factor of three figures.

It may be appreciated from the above description that the square areas may be defined to have the specific relationship between the each elastic structure such that the square areas can differ from one elastic structure to another, and the ranges of gas pressures that can be measured from any change in the capacitance that develops between each combination of the elastic structure and corresponding fixed electrode can differ for each combination. In other words, the range of pressures that can be measured at one combination of the elastic structure and corresponding fixed electrode may be different from the range of pressures that can be measured at the other combination of the elastic structure and corresponding fixed electrode. This difference in the pressure ranges may be determined by the relative square areas of the elastic structures. As combined, the pressure ranges that are measured by a plurality of combination of the elastic structure and corresponding fixed electrode will cover the wider range of pressures that are different from one range to another but are successive from one range to another. So that, any pressures in the wide pressure range is measured effectively by a single capacitive vacuum sensor.

If the pressure range that is to be measured at each elastic structure could be switched between the elastic structures with no problem, the square area $S_1$ of one elastic structure and the square area $S_2$ of the other elastic structure may have the ratio of 9.99, in which case pressures as expressed in terms of four figures might be measured, or may have the ratio of 31.58, in which case pressures as expressed in terms of six figures might be measured. Practically, however, it would be difficult to design the vacuum sensor to meet the above requirements.

As an alternative solution, the vacuum sensor may be so designed that each of the pressure range that are to be measured at the first and second elastic structures may include some of the pressure ranges that are overlapped each other, and practical overlapped pressure ranges are to be set for decreasing the overlapped pressure ranges as small as possible, and the different pressure ranges, which are different from one pressure range to another but are successive from one range to another, are measured at each respective elastic structure each having a successively different area (size).

The capacitive vacuum sensor that is commercially available includes an electrical circuit that is usually capable of processing input signals with the precision of up to three figures. Although it is possible to implement an electrical circuit that provides the precision of more than three figures, there are some problems to be solved. One problem is to remove any noise or drift, another problem is to take special measures against any change in the ambient temperature, and still another problem is to take measures against any vibrations.

Now, consider an example that is more practical and more economical. In this example, the capacitive vacuum sensor includes the electrical circuit that is capable of processing input data with the precision of three figures, but it is improved so that pressures within one pressure range can be measured at one elastic structure, while pressures within a different pressure range that succeed from the one pressure range can be measured at the other elastic structure, without regard to the above problems.

In most of the existing capacitive vacuum sensors, the input (pressure) and the output (voltage) have the proportional relationship. For example, if any change in the pressure is represented by three figures, the output voltage will also be represented by three figures. For example, suppose that the three figures precision electrical circuit is set to provide output of 10 V in response to input pressure of 10,000 Pa. In this case, the capacitive vacuum sensor including such electrical circuit may measure any pressures up to 10 Pa and provide the output voltage of 0.01 V (=10 mV) accordingly, which means that the sensor can measure any pressures within the pressure range as expressed in terms of three figures, specifically 10 Pa to 10,000 Pa.

If the capacitive vacuum sensor including the three-digit precision electrical circuit and the diaphragm electrode having the elastic structures each having the square shape whose one side is of a length $a$, and is set to provide output voltage of 10V when the pressure of 10,000 Pa occurs at the first elastic structure having the smallest square area, the pressures from 10 Pa to 10,000 Pa can be measured at the first elastic structure. Then, if it is set to provide output voltage of 10 V when the pressure of 10 Pa occurs at the second elastic structure having the next smallest square area, the pressures from 0.01 Pa to 10 Pa can be measured at the second elastic structure. In this capacitive vacuum sensor that includes the first and second elastic structures, the total pressures that can be measured include the pressures having the magnitude of up to six figures, and the square area $S_1$ of the first elastic structure and the square area $S_2$ of the second elastic structure can have the specific relationship of $S_2=31.58\ (=5.62^2)\times S_1$, since the gas pressures being measured are proportional to the fourth power of a, which represents the length of one side of the square elastic structure, and $1000^{1/4}=5.62$.

If the pressure ranges that may be measured at the before described first and second elastic structures may be switched between the two without any problem, the square areas of first and second elastic structures might be set such that they have the specific relationship of $S_2=31.58\ (=5.62^2)\times S_1$. But, it is preferable and practical to design the first and second elastic that each of the pressure ranges that are to be measured at the each respective first and second elastic structures may include some of the pressures that may be allowed to overlap each other.

The practical pressure ranges for the first and second elastic structures should preferably be determined such that they permit the square areas $S_1$ and $S_2$ of the first and second elastic structures to have the specific relationship (ratio) of between 15 and 70 (specifically, $3.9=15\frac{1}{2}$ to $8.4=70\frac{1}{2}$, for one side $a$ of the square elastic structures), which may be determined, depending on the particular precision provided by the particular electrical circuit used. In this pressure range, the elastic structures may be deformed in proportion to the fourth power of $a$, or may be deformed within a range of between $225=3.9^4$ and $4900=8.4^4$.

As described earlier, the deflecton of the elastic structures and the corresponding output voltages may have the proportional relationships. So that, the before described deformed range of elastic structures (between 225 and 4900) can be converted into the figures of the precision of electric circuit such as between 2.35 ($=\log_{10} 225$) and 3.69 ($=\log_{10} 4900$).

More specifically, by changing the square areas of plural elastic structures so that the elastic structures can have the respective square areas that are different from each other according to the specific ratio, within the before described range (that is, the range of between 15 and 70), a capacitive vacuum sensor can be provided as follows.

Within the before described range, the precision of the electrical circuit can be designed at the ranges between 2.35 figures and 3.69 figures containing 3 (three) figures. And within the before described range, the pressure range which can be measured by any combination of elastic structure and corresponding fixed electrode is successively different from every other combination with measuring 3 (three) figures pressure range at each combination and decreasing as small as possible the overlapped pressure ranges measured at each combination, and without taking particular countermeasure against the ambient temperature and vibrations onto the electrical circuit having its precision range up to three figures and adopted in the commercially available capacitive vacuum sensor. Therefore, within the before described range (that is, the range of between 15 and 70), the wider range of pressures can be covered effectively by the single capacitive vacuum sensor.

Figure 3:
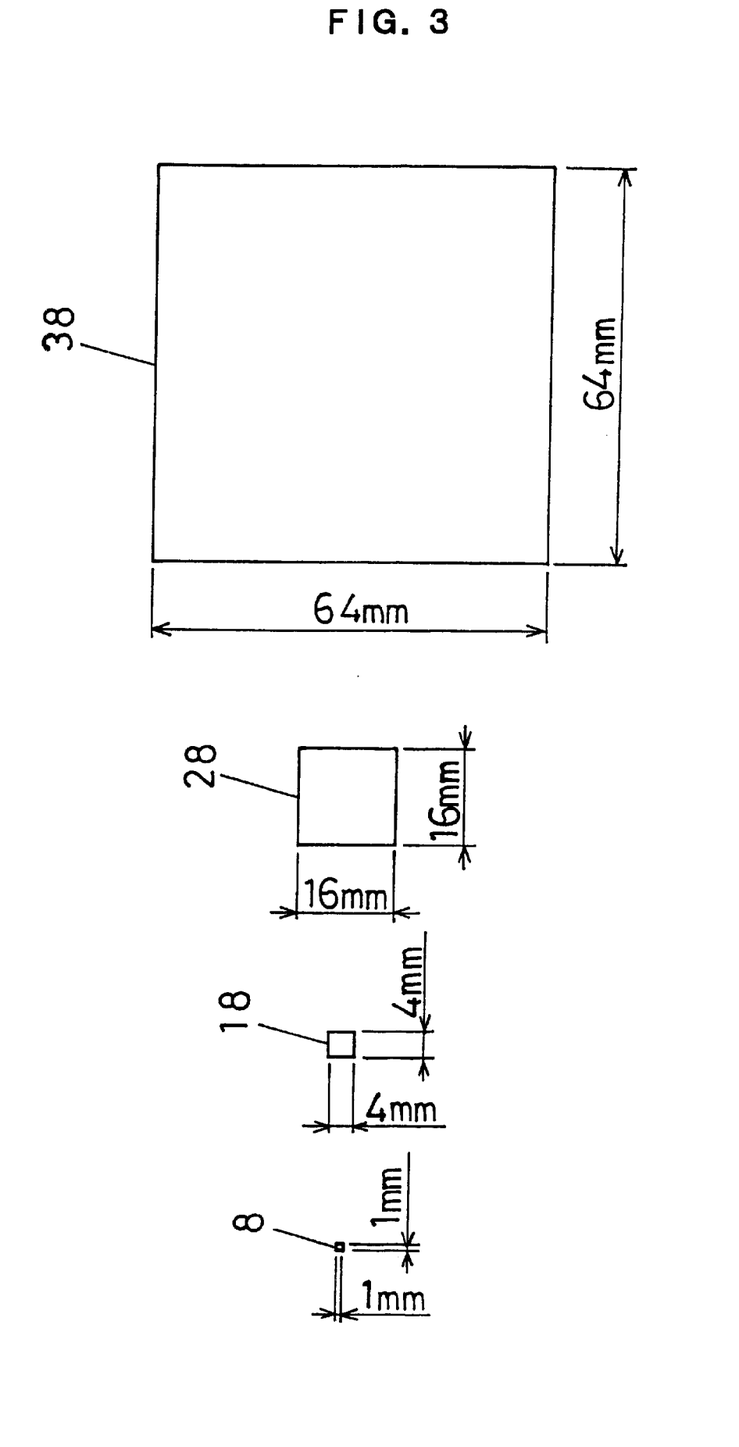
FIG. 3 is a plan view of the different elastic structures in the vacuum sensor according to the present invention, and illustrates that those elastic structures have different areas defined by a specific ratio among them.

As shown in FIG. 3, the different elastic structures may have the square areas that differ successively from one to another, as defined by the ratio of between 15 and 70. More specifically, those elastic structures may have the relationships in terms of the square area, as defined by the ratio between 15 and 70, such that a first elastic structure 8 has the smallest area, a second elastic structure 18 has the second smallest area that is equal to 15 to 70 times the area of the first elastic structure 8, a third elastic structure 28 has the third smallest area that is equal to 15 to 70 times the area of the second elastic structure 18, a fourth elastic structure 38 has the fourth smallest area that is equal to 15 to 70 times the area of the third elastic structure 28, and so on. In FIG. 3, there are multiple elastic structures 8 through 38. Those elastic structures have the different square areas as defined by that ratio of between 15 and 70, such that the elastic structure 18 has the area (16 mm square) equal to 16 times the area (1 mm square) of the elastic structure 8, the elastic structure 28 has the area (256 mm square) equal to 16 times the area (16 mm square) of the elastic structure 18, and the elastic structure 38 has the area (4096 mm square) equal to 16 times the area (256 mm square) of the elastic structure 28.

In the foregoing description, each elastic structure has the square shape whose one side is of a length a, but other shapes are possible, such as rectangular, round and elliptical shapes. The preceding description applies to those other shapes. That is, by changing the size or area of the elastic structures so that the elastic structures can have the respective relative sizes or areas, as defined by the specific ratio, that differ successively from one to another, the pressure range which can be measured by anyone combination of elastic structure and corresponding fixed electrode is successively different from each combination to another with measuring 3 (three) figures pressure range at each combination and decreasing as small as possible the overlapped pressure ranges measured at each combination, and without taking particular countermeasure against the ambient temperature and vibrations onto the electrical circuit having its precision range up to three figures and adopted in the commercially available capacitive vacuum sensor. Therefore, the wider range of pressures can be covered effectively.

Although some technical or economical problems may arise when any particular measures are taken against the environmental temperature and/or vibrations, the electrical circuit may be modified to provide the higher precision, such as four or five figures. In this case, as the output voltage is proportional to the pressure, the respective pressure ranges (as expressed in terms of the number of figures) that are to be measured by making use of any change in the capacitance that develops between each elastic structure and the corresponding fixed electrode may be varied. Therefore, the before described range of ratio (such as between 15 and 70 in the before described case) may be changed according to the said variation of pressure range (as expressed in terms of the number of figures) due to the improvement of precision of the electrical circuit. That is to say, the suitable range of ratio between the sizes or areas of each elastic structures having each respective different size or area may be determined in the case that the electrical circuit having the higher precision of four or five figures. Under the said suitable range of ratio, it is also possible that the pressure range which can be measured by anyone combination of elastic structure and corresponding fixed electrode is successively different from each combination to another with measuring four to five figures pressure range at each combination and decreasing as small as possible the overlapped pressure ranges measured at each combination. Therefore, the wider range of pressures can be covered effectively.

In the capacitive vacuum sensor according to the present invention, the compensation electrodes, each of which has the same square area as each respective one of the fixed electrodes and is located adjacent to each corresponding fixed electrode, should preferably be disposed on the non-conducting substrate so that they face opposite the rigid structures supporting the elastic structures of diaphragm electrode.

As described, the elastic structures deflect not only when any change in the gas pressure being measured occurs, but also when the component parts in the vacuum sensor are thermally expanded or contracted in response to any change in the surrounding temperature. For the latter case, if the deflection is detected as the change in the capacitance between the fixed electrodes and elastic structures, it will cause an error in measuring the pressures.

In the prior art vacuum sensor, to avoid this, the compensation electrodes are provided near the fixed electrodes, and the change in the capacitance as detected by the fixed electrodes are compensated by the change in the capacitance as detected by the compensation electrodes. The change in the capacitance due to the thermal expansion or contraction is thus canceled, and the pure change in the capacitance due to the change in the pressure, from which the change in the capacitance due to the thermal change is excluded, may be detected.

In the capacitive vacuum sensor according to the present invention, the compensation electrodes are located to face opposite the rigid structures supporting the elastic structure of diaphragm electrode, rather than opposite the elastic structures of the diaphragm electrode. This makes the compensation electrodes insensitive to any change in the capacitance that may occur due to any change in the pressure, but sensitive to any change in the capacitance that may be caused by the thermal expansion or contraction.

More specifically, the present invention allows the change in the capacitance between the fixed electrodes and elastic structures to be compensated by the change in the capacitance between the compensation electrodes and rigid structures that contains nothing related to the change in the capacitance due to the change in the pressure. In other words, the change in the capacitance that corresponds to the real change in the pressure that is caused by the change in the capacitance between the fixed electrodes and elastic structures will not be affected by the compensation electrodes, that is, will not be canceled. The sensitivity of the vacuum sensor to any change in the pressure can thus be increased.

As described above, each of the compensation electrodes is located near each respective one of the fixed electrodes, and has the same area as the corresponding fixed electrode. Each of the compensation electrodes may be arranged to surround the corresponding fixed electrode.

In the capacitive vacuum sensor according to the present invention, as described above, there is the space that is defined between the elastic structures, or the diaphragm electrode, and the corresponding fixed electrodes on the non-conducting substrate. This space is the single closed space. There is also the slit on part of the non-conducting substrate that communicates with the single closed chamber and within which the nonevaporable getter is preferably accommodated.

According to the construction just described above, although the diaphragm electrode has plural elastic structures, the reference pressure chamber may be provided simply by delimiting the single closed space between the elastic structures and fixed electrodes, without having to provide the particular partitions for the reference pressure chamber. And, the reference pressure chamber can be kept under the constant pressure of below 1 Pa. This construction may aid in simplifying the manufacturing process, thereby increasing the productivity of the capacitive vacuum sensor.

In the capacitive vacuum sensor according to the present invention, a plurality of projections should preferably be provided on the surface of the each elastic structures which facing opposite the corresponding fixed electrodes located on the non-conducting substrate.

According to the construction just described above, those projections may serve to detach the elastic structures away from the corresponding fixed electrodes, when the pressures are reduced, even if the elastic structures have been pressed against by the corresponding fixed electrodes facing opposite them under the higher pressures.

In the capacitive vacuum sensor according to the present invention, the non-conducting substrate should preferably include electrically conducting leads that should preferably extend therethrough for providing the electrical connections between one side (front side) of the non-conducting substrate on which the fixed electrodes and compensation electrodes are located and the other side (rear side) of the non-conducting substrate.

According to the construction just described above, good electrical connection between the front side and rear side of the non-conducting substrate is provided, and the electrical signal from the fixed electrodes and compensation electrodes located on the front side of non-conducting substrate is correctly fed to the electric circuit, which is provided out of the non-conducting substrate, by and through the before described electrically conducting leads. So that, the present invention provides the highly reliable vacuum sensors. And, if the vacuum equipment including the vacuum sensor of the present invention, which provides high reliability as the before described, is used for manufacturing electronics components or semiconductor devices, the electronics components, etc. can be manufactured with a higher yield.

According to the present invention, any pressures in the wide pressure range, i.e., the pressures of the magnitude of 6 figures or more, is measured by the single vacuum sensor with the high precision and efficiency.

When the micromachining technique is used, the diaphragm electrode may include a single elastic structure or multiple elastic structures, both of which may be formed through the same number of processing steps. Thus, by preparing the capacitive vacuum sensor of the present invention using the micromachining technology, the layout of the sensor construction may be redesigned easily. It is therefore easy to prepare the diaphragm electrode for including multiple elastic structures, each of which may have a different square area such that the square areas differ from one elastic structure to another. In this way, the pressure range that can be measured using the changes of capacitance that develops between the each elastic structure and each corresponding fixed electrode may differ from each other combination of the elastic structure and fixed electrode. Accordingly, a wider range of gas pressures may be measured by the single capacitive vacuum sensor.

Any possible error in measuring the pressure that may occur due to the thermal expansion or contraction can be compensated more efficiently and more accurately than by using the conventional error correcting method. Thus, the sensitivity of the vacuum sensor to the pressure may be enhanced.

The vacuum sensor of the present invention includes the means for preventing the elastic structures from attaching to the corresponding fixed electrodes, even if the gas pressure is very high. Thus, the pressures can be measured with higher reliability.

The vacuum sensor includes a single reference pressure chamber, and also includes a non-conducting substrate through which the necessary electrically conducting leads may be provided. Thus, the manufacturing steps may be simplified, and the vacuum sensor may have the simplified construction. Vacuum sensors may be provided with a higher yield and a higher productivity than the conventional vacuum sensors.

DETAILED DESCRIPTION OF THE PREFERRED EMBODIMENTS

Figure 1:
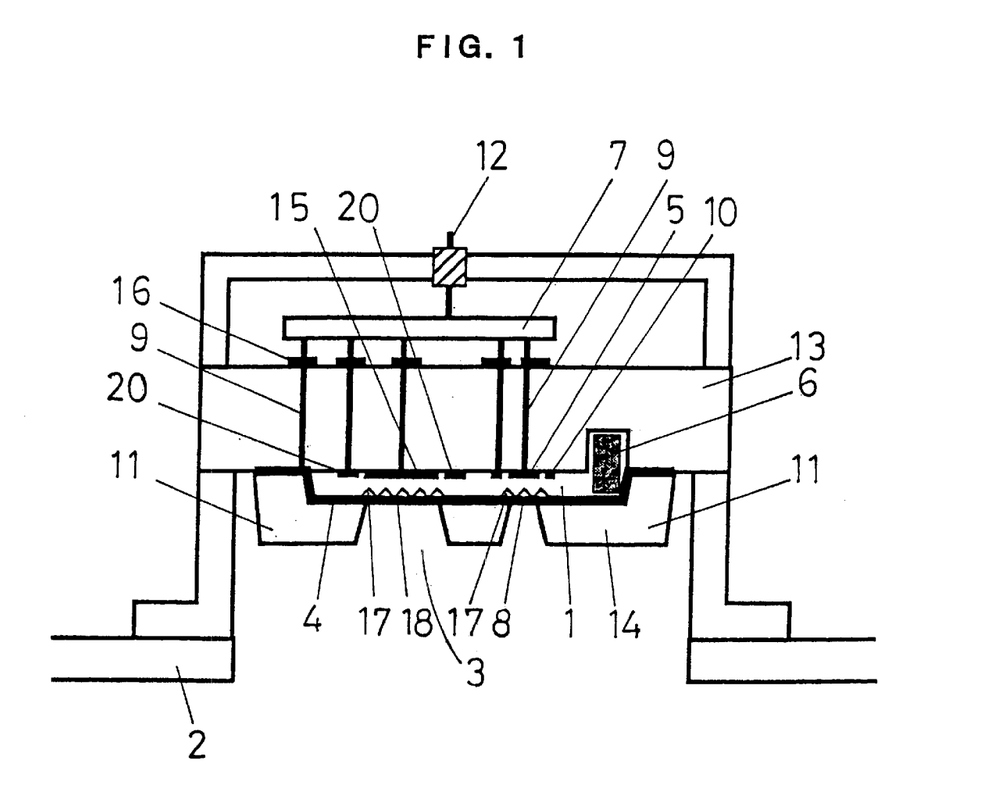
FIG. 1 is a schematic diagram illustrating a particular embodiment to which the present invention may be applied.

Referring now to FIG. 1, a preferred embodiment of the present invention is described.

The capacitive vacuum sensor shown in FIG. 1 is manufactured by using the micromachining technique and by applying a semiconductor manufacturing process technology to it. The vacuum sensor includes a vacuum sensor chip that is composed of a non-conducting substrate 13 and a silicon substrate 14 bonded together, having the dimensions of several millimeters (mm) to several ten millimeters (mm) square and one millimeter (mm) thick.

The silicon substrate 14 has a recess on each of the opposite sides, and comprises elastic structures 8, 18 and a rigid structure 11.

The non-conducting substrate 13 may be made of glass material, such as Pyrex™ glass offered by Coning, Inc. or SDII™ glass offered by HOYA, Inc., that has the thermal expansion coefficient near that of silicon. The non-conducting substrate 13 has electrically conducting leads 9 extending therethrough and providing an electrical connection between the front side (lower side in FIG. 1) and the rear side (upper side in FIG. 1).

The non-conducting substrate 13 and the silicon substrate 14 are bonded together under the vacuum atmosphere, and a reference pressure chamber 1 is formed between the non-conducting substrate 13 and the silicon substrate 14, creating a single closed space placed under vacuum.

The non-conducting substrate 13 further has a slit on its bottom, which communicates with the reference pressure chamber 1 and inside which a getter 6 is accommodated. The getter 6 is provided for adsorbing any gas that remains inside the reference pressure chamber 1, keeping the reference pressure chamber 1 under vacuum of below 1 Pa.

The side of the silicon substrate 14 on which the non-conducting substrate 13 is located has boron (B) doped and diffused to a depth of about 7 $\mu$m, which acts as a diaphragm electrode 4.

The silicon substrate 14 has a plurality of partly deep grooves formed on the opposite side of the side on which the diaphragm electrode 4 is located. The diaphragm electrode 4 is exposed through the grooves. The portion of the diaphragm electrode 4 that is exposed is formed by elastic structures 8, 18 of 7 $\mu$m thick. The elastic structures 8, 18 are supported by rigid structure 11.

On the side of the non-conducting substrate 13 on which the reference pressure chamber 1 is located, there are fixed electrodes 5, 15 that are formed to face opposite each corresponding one of the elastic structures 8, 18.

The elastic structures 8, 18 deflect in response to the differential between the internal pressure inside the reference pressure chamber 1 and the pressure in the region 3 leading to vacuum equipment 2. As the elastic structures 8, 18 become deflected, the capacitance that develops between the diaphragm electrode 4 and fixed electrodes 5, 15 may change accordingly. The change in the capacitance may be transmitted by way of the electrically conducting leads 9 and electrode pad 16 to an electrical circuit 7. In response to the change in the capacitance, the electrical circuit 7 converts that change into the corresponding electrical signal that appears at an electrical output terminal 12. The current pressure that is then present in the region 3 leading to the vacuum equipment 2 may be determined from this output electrical signal.

The elastic structures 8, 18 may become deflected in response to the pressure in the region 3 leading to the vacuum equipment 2. When there is a high pressure in the region 3, such as the atmospheric pressure, the elastic structures 8, 18 tend to become deflected so much that they may be pressed against by the corresponding fixed electrodes 5, 15. When the pressure in the region 3 returns to the lower pressure, the deflection of the elastic structures 8, 18 will become smaller. Finally, the elastic structures 8, 18 should be detached from the corresponding fixed electrodes 5, 15, moving away from the same.

It should be noted, however, that there is a weak attractive force, such as the force of van der Waals adsoption, between the fixed electrodes 5, 15 and corresponding elastic structures 8, 18. For the conventional capacitive vacuum sensor, this weak attractive force will still be in effect even when the pressure in the region 3 gets back to the lower pressure. Thus, the fixed electrodes 5, 15 and elastic structures 8, 18 remains attached, which prevents the accurate pressure measurement.

For the capacitive vacuum sensor of the present invention, however, the elastic structures 8, 18 include a great number of projections 17 formed thereon that may have the square conical or conical shape having the bottom side of several $\mu$m to several hundreds $\mu$m and the height of several $\mu$m. Those projections 17 serve to cancel the effect of the before described physical attraction that causes elastic structures 8, 18 and fixed electrode 5, 15 closely to contact each other, and prevent the surfaces of elastic structures 8, 18 from being attached to the surfaces of corresponding fixed electrodes 5, 15 with large area. When the pressure in the region 3 returns to the lower pressure, the projections 17 help the elastic structures 8, 18 detached from the fixed electrodes 5, 15.

Figure 2:
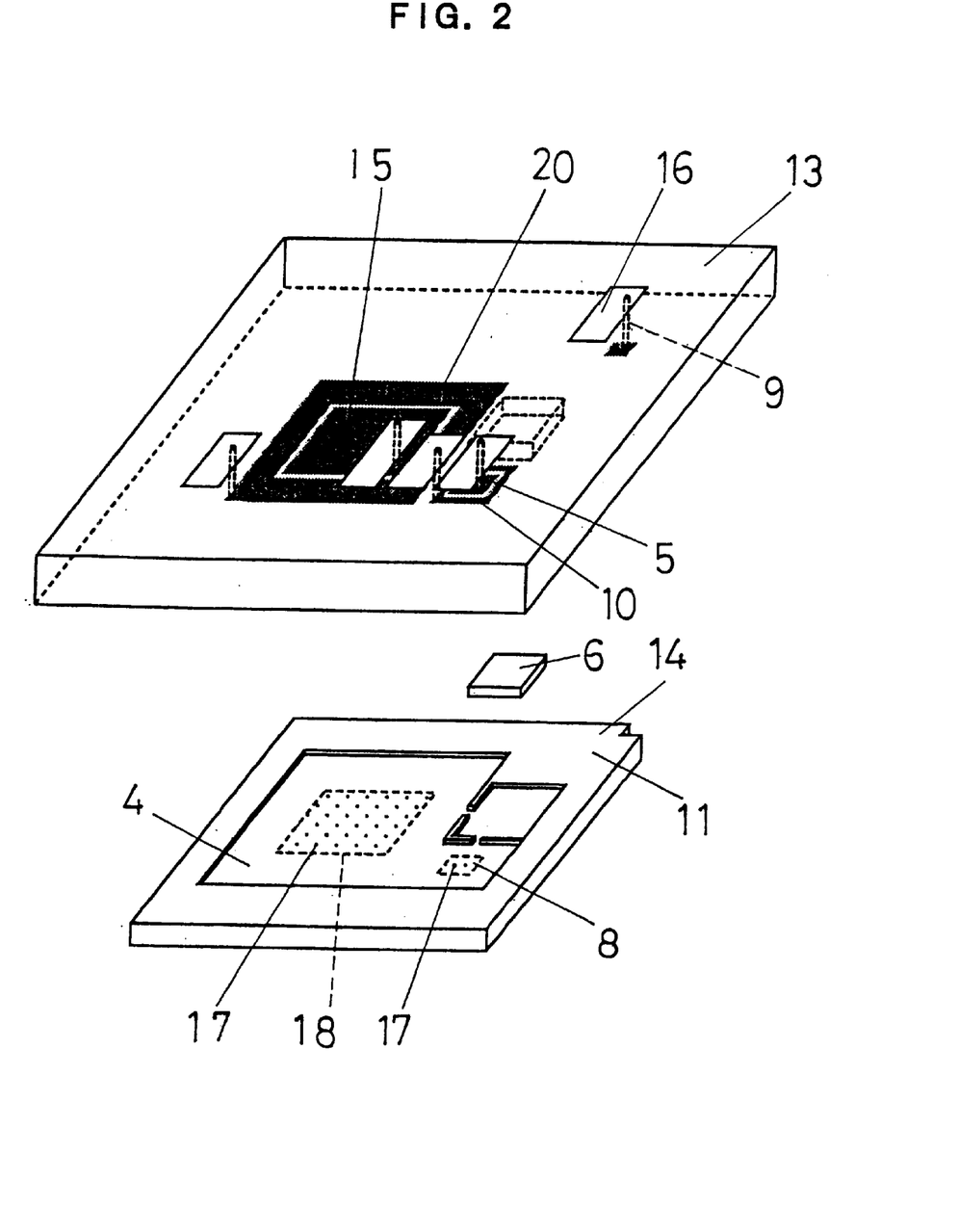
FIG. 2 is a three-dimensional (3D) view showing the elements on the vacuum sensor chip according to the embodiment shown in FIG. 1.

FIG. 2 is a three-dimensional (3D) view that represents the capacitive vacuum sensor chip (composed of the non-conducting substrate 13 and silicon substrate 14 bonded together) according to the embodiment shown in FIG. 1.

In FIG. 2, the elastic structures include two elastic structures, for example, both of which have a square shape. For example, one, as identified by 18, is 4 mm square, and the other, as identified by 8, is 1 mm square. Specifically, those elastic structures 8, 18 have a different square area, that is, the elastic structure 8 has the smallest square area (such as 1 mm square) while the elastic structure 18 has the square area (16 mm square) that is equal to 16 times that of the elastic structure 8.

On the side of the non-conducting substrate 13 on which the reference pressure chamber 1 is located, there are fixed electrodes 5, 15 that are located to face opposite the elastic structures 8, 18. Specifically, the fixed electrode 5 is located to face opposite the elastic structure 8, and has the same size and square area as those of the elastic structure 8, while the fixed electrode 15 is located to face opposite the elastic structure 18, and has the same size and square area as those of the elastic structure 18. There are also compensation electrodes 10, 20, each of which surrounds each corresponding one of the fixed electrodes 5, 15, and has the same square area as that of the corresponding fixed electrode.

The fixed electrodes 5, 15 and the corresponding compensation electrodes 10, 20 have the same square areas, respectively. Thus, when the elastic structures 8, 18 (or the diaphragm electrode 4 formed by them) are placed in the initial flat position (that is, when the internal pressure inside the reference pressure chamber 1 is equal to the pressure in the region 3 leading to vacuum equipment 2), the capacitance between the elastic structures 8, 18 and corresponding fixed electrodes 5, 15 is equal to the capacitance that develops between the rigid structures 11, 11 of the diaphragm electrode 4 and corresponding compensation electrodes 10, 20.

When the current pressure in the region 3 leading to the vacuum equipment 2 is then rising, it causes the elastic structures 8, 18 of the diaphragm electrode 4, to be deflected, moving toward the corresponding fixed electrodes 5, 15. The capacitance that develops between the elastic structures 8, 18 of the diaphragm electrode 4 and the fixed electrodes 5, 15 is increased accordingly. In contrast, the capacitance that develops between the rigid structures 11, 11 and the compensation electrodes 10, 20 remains unchanged regardless of any change in the pressure in the region 3 leading to the vacuum equipment 2, because the compensation electrodes 10, 20 are located opposite the rigid structures 11, 11.

The component parts within the vacuum sensor, such as the fixed electrodes, elastic structures, compensation electrodes, and so on, may be expanded or contracted thermally in response to any change in the ambient temperature in which the vacuum sensor is operating. When this occurs, the capacitance that is detected at the fixed electrodes 5, 15 and compensation electrodes 10, 20 may be affected, causing an error in measuring the accurate pressure. It should be noted, however, that if the change in the ambient temperature affects those component parts equally, the change in the capacitance that may be caused by the thermal expansion or contraction should be equal at the fixed electrodes 5, 15 as well as at the compensation electrodes 10, 20. Thus, the change in the capacitance that is detected at the fixed electrodes 5, 15 may be cancelled by the change in the capacitance that is detected at the compensation electrodes 10, 20. Thus, the change in the capacitance due to the thermal expansion or contraction will be zero, and the resulting capacitance, from which the above change is excluded, will reflect the accurate pressure.

In this embodiment, the compensation electrodes 10, 20 are designed not to be affected by, or to be insensitive to, any change in the pressure. If the change in the capacitance that is detected at the fixed electrodes 5, 15 includes the change due to the thermal expansion or contraction as well as the change due to the change in the pressure, the latter change will not be cancelled by the compensation electrodes 10, 20. This enhances the sensitivity of the vacuum sensor to any change in the pressure.

When the 4 mm square fixed electrode 15 is placed at the pressure region of below 40 Pa, and the 1 mm square fixed electrode 5 is placed at the pressure region of below 10,000 Pa, it can be thought that the corresponding elastic structures 18, 8 will be deflected in proportion to the respective pressures. Then, if the 1 mm square fixed electrode 5 is set to provide output voltage of 10 V when the pressure is 10,000 Pa, and the electrical circuit is capable of processing the output voltage at the precision up to three figures, any pressures that range between 10 Pa and 10,000 Pa may be measured at the 1 mm square fixed electrode 5. Similarly, if the 4 mm square fixed electrode 15 is set to provide output voltage of 10 V when the pressure is 10 Pa, any pressures that range between 0.01 Pa and 10 Pa may be measured at the 4 mm square fixed electrode 15. As combined, the total pressure range that can be measured will cover the pressures as expressed in terms of six figures, that is, the pressures from 0.01 Pa up to 10,000 Pa. This may be achieved without having to provide any particular measures against the changing ambient temperature or any possible noises.

In the embodiment described so far, the diaphragm electrode 4 is formed by the elastic structure 8 having the smallest square area and the elastic structure 18 having the square area equal to 16 times that of the elastic structure 8. It should be noted, however, that the relative square areas of the elastic structures 8 and 18 may be determined such that some of the pressures in the pressure range that can be measured at the elastic structure 8 and the corresponding fixed electrode 5, and some of the pressures in the pressure range that can be measured at the elastic structure 18 and the corresponding fixed electrode 15 can be allowed to overlap each other slightly but not too much, provided that the electrical circuit has the precision of three figures, and that the pressure range that can be measured at the elastic structure 8 and fixed electrode 5 can be shifted efficiently and successively to the pressure range that can be measured at the elastic structure 18 and fixed electrode 15, or vice versa.

Although this is not shown, the capacitive vacuum sensor may further include a third elastic structure. The third elastic structure may have the square area equal to 15 to 70 times that of the elastic structure 18. In this case, the pressure range that can be measured by the single vacuum sensor may become larger.

In the embodiment described so far, the elastic structures have the square shape, but it may be understood that this is only shown by way of example, and other shapes such as round, rectangular or the like may also be employed. The present invention may also provide the similar effect when those other shapes are employed.

Although the present invention has been described with reference to the particular embodiments of the present invention, it should be understood that various changes and modifications may be made without departing from the spirit and scope of the invention as defined in the appended claims.

What is claimed is:

1. A capacitive vacuum sensor for providing electrical information to an electrical circuit in response to pressure exerted by a gas, said capacitive vacuum sensor comprising:
   a rigid structure comprising a diaphragm electrode portion having a plurality of elastic portions and a rigid portion for supporting said plurality of elastic portions, each of said plurality of elastic portions having an area that is different than the remaining elastic portions, each of said elastic portions arranged so as to contact the gas, each of said elastic portions being capable of deforming a deformation amount that is proportional to its area in response to a pressure exerted by the gas, each area of said elastic portions differs from the remaining areas of said elastic portions such that each respective deformation amount differs successively;
   a non-conducting substrate arranged to oppose said rigid structure such that a space is disposed between said non-conducting substrate and said rigid structure;
   a plurality of fixed electrodes disposed on a side of said non-conducting substrate, the number of fixed electrodes in said plurality of fixed electrodes is equal to the number of elastic portions in said plurality of elastic portions, each of said fixed electrodes is disposed so as to oppose a respective one of said elastic portions, each of said fixed electrodes having an area equal to the area of said respective one of said elastic portions, whereby a change in capacitance between each fixed electrode and respective elastic portion in response to a deformation of said respective elastic portion in accordance with the pressure exerted by the gas provides electrical information to an electrical circuit such that the pressure of the gas is determined from the electrical information; and
   a plurality of compensating electrodes disposed on said non-conducting substrate, each of said compensating electrodes being disposed adjacent a respective one of said fixed electrodes so as to oppose said rigid portion, each of said compensating electrodes having an area equal to the area of said respective one of said fixed electrodes.

2. The capacitive vacuum sensor of claim 1, further comprising a nonevaparable getter,
   wherein the space disposed between said non-conducting substrate and said rigid structure comprises a single closed space,
   wherein said non-conducting substrate has a slit formed thereon for communicating with the single closed space, and
   wherein said nonevaparable getter is disposed in the single closed space.

3. The capacitive vacuum sensor of claim 2, wherein each of said plurality of elastic portions has a plurality of projections on a surface thereof that opposes each corresponding one of said plurality of fixed electrodes.

4. The capacitive vacuum sensor of claim 3, further comprising electrically conducting leads passing through said non-conducting substrate,
   wherein each said lead is capable of providing an electrical connection between said side of said non-conducting substrate and another side of said non-conducting substrate, and
   wherein each said area of said elastic portions differs from the remaining areas of said elastic portions such that each respective amount of deformation differs successively by a ratio between 15 and 70.

5. The capacitive vacuum sensor of claim 2, further comprising electrically conducting leads passing through said non-conducting substrate,
   wherein each said lead is capable of providing an electrical connection between said side of said non-conducting substrate and another side of said non-conducting substrate.

6. The capacitive vacuum sensor of claim 2, wherein each said area of said elastic portions differs from the remaining areas of said elastic portions such that each respective amount of deformation differs successively by a ratio between 15 and 70.

7. The capacitive vacuum sensor of claim 1, wherein each of said plurality of elastic portions has a plurality of projections on a surface thereof that opposes each corresponding one of said plurality of fixed electrodes.

8. The capacitive vacuum sensor of claim 7, further comprising electrically conducting leads passing through said non-conducting substrate,
   wherein each said lead is capable of providing an electrical connection between said side of said non-conducting substrate and another side of said non-conducting substrate.

9. The capacitive vacuum sensor of claim 7, wherein each said area of said elastic portions differs from the remaining areas of said elastic portions such that each respective amount of deformation differs successively by a ratio between 15 and 70.

10. The capacitive vacuum sensor of claim 1, further comprising electrically conducting leads passing through said non-conducting substrate,
    wherein each said lead is capable of providing an electrical connection between said side of said non-conducting substrate and another side of said non-conducting substrate.

11. The capacitive vacuum sensor of claim 10, wherein each said area of said elastic portions differs from the remaining areas of said elastic portions such that each respective amount of deformation differs successively by a ratio between 15 and 70.

12. The capacitive vacuum sensor of claims 1, wherein each said area of said elastic portions differs from the remaining areas of said elastic portions such that each respective amount of deformation differs successively by a ratio between 15 and 70.

13. A capacitive vacuum sensor for providing electrical information to an electrical circuit in response to pressure exerted by a gas, said capacitive vacuum sensor comprising:
 a rigid structure comprising a diaphragm electrode portion having a plurality of elastic portions and a rigid portion for supporting said plurality of elastic portions, each of said plurality of elastic portions having an area that is different than the remaining elastic portions, each of said elastic portions arranged so as to contact the gas, each of said elastic portions being capable of deforming a deformation amount that is proportional to its area in response to a pressure exerted by the gas, each area of said elastic portions differs from the remaining areas of said elastic portions such that each respective deformation amount differs successively;
 a non-conducting substrate arranged to oppose said rigid structure such that a single closed space is disposed between said non-conducting substrate and said rigid structure; and
 a plurality of fixed electrodes disposed on a side of said non-conducting substrate, the number of fixed electrodes in said plurality of fixed electrodes is equal to the number of elastic portions in said plurality of elastic portions, each of said fixed electrodes is disposed so as to oppose a respective one of said elastic portions, each of said fixed electrodes having an area equal to the area of said respective one of said elastic portions, whereby a change in capacitance between each fixed electrode and respective elastic portion in response to a deformation of said respective elastic portion in accordance with the pressure exerted by the gas provides electrical information to an electrical circuit such that the pressure of the gas is determined from the electrical information; and further consisting
 a nonevaparable getter disposed in the single closed space,
 wherein said non-conducting substrate has a slit formed thereon for communicating with the single closed space.

14. The capacitive vacuum sensor of claim 13, further comprising a plurality of compensating electrodes disposed on said non-conducting substrate, each of said compensating electrodes being disposed adjacent a respective one of said fixed electrodes so as to oppose said rigid portion, each of said compensating electrodes having an area equal to the area of said respective one of said fixed electrodes.

15. The capacitive vacuum sensor of claim 13, wherein each of said plurality of elastic portions has a plurality of projections on a surface thereof that opposes each corresponding one of said plurality of fixed electrodes.

16. The capacitive vacuum sensor of claim 13, further comprising electrically conducting leads passing through said non-conducting substrate,
 wherein each said lead is capable of providing an electrical connection between said side of said non-conducting substrate and another side of said non-conducting substrate.

17. The capacitive vacuum sensor of claims 13, wherein each said area of said elastic portions differs from the remaining areas of said elastic portions such that each respective amount of deformation differs successively by a ratio between 15 and 70.

18. A capacitive vacuum sensor for providing electrical information to an electrical circuit in response to pressure exerted by a gas, said capacitive vacuum sensor comprising:
 a rigid structure comprising a diaphragm electrode portion having a plurality of elastic portions and a rigid portion for supporting said plurality of elastic portions, each of said plurality of elastic portions having an area that is different than the remaining elastic portions, each of said elastic portions arranged so as to contact the gas, each of said elastic portions being capable of deforming a deformation amount that is proportional to its area in response to a pressure exerted by the gas, each area of said elastic portions differs from the remaining areas of said elastic portions such that each respective deformation amount differs successively;
 a non-conducting substrate arranged to oppose said rigid structure such that a space is disposed between said non-conducting substrate and said rigid structure;
 a plurality of fixed electrodes disposed on a side of said non-conducting substrate, the number of fixed electrodes in said plurality of fixed electrodes is equal to the number of elastic portions in said plurality of elastic portions, each of said fixed electrodes is disposed so as to oppose a respective one of said elastic portions, each of said fixed electrodes having an area equal to the area of said respective one of said elastic portions, whereby a change in capacitance between each fixed electrode and respective elastic portion in response to a deformation of said respective elastic portion in accordance with the pressure exerted by the gas provides electrical information to an electrical circuit such that the pressure of the gas is determined from the electrical information; and
 electrically conducting leads passing through said non-conducting substrate,
 wherein each said lead is capable of providing an electrical connection between said side of said non-conducting substrate and another side of said non-conducting substrate.

19. The capacitive vacuum sensor of claim 18, further comprising a nonevaparable getter,
 wherein the space disposed between said non-conducting substrate and said rigid structure comprises a single closed space,
 wherein said non-conducting substrate has a slit formed thereon for communicating with the single closed space, and
 wherein said nonevaparable getter is disposed in the single closed space.

20. The capacitive vacuum sensor of claim 18, wherein each of said plurality of elastic portions has a plurality of projections on a surface thereof that opposes each corresponding one of said plurality of fixed electrodes.

21. The capacitive vacuum sensor of claim 18, wherein each said area of said elastic portions differs from the remaining areas of said elastic portions such that each respective amount of deformation differs successively by a ratio between 15 and 70.

* * * * *